(12) United States Patent
Rayrole

(10) Patent No.: US 8,509,119 B2
(45) Date of Patent: Aug. 13, 2013

(54) METHOD OF MANAGING RESOURCES IN A TELECOMMUNICATION NETWORK OR A COMPUTING SYSTEM

(75) Inventor: Martin Rayrole, Chatillon (FR)

(73) Assignee: Thales, Neuilly sur Seine (FR)

( * ) Notice: Subject to any disclaimer, the term of this patent is extended or adjusted under 35 U.S.C. 154(b) by 356 days.

(21) Appl. No.: 12/980,646

(22) Filed: Dec. 29, 2010

(65) Prior Publication Data

US 2012/0014393 A1    Jan. 19, 2012

(30) Foreign Application Priority Data

Dec. 30, 2009  (FR) ..................................... 09 06394

(51) Int. Cl.
*H04L 12/28*  (2006.01)
*H04L 12/43*  (2006.01)
*G06Q 10/00*  (2012.01)
*G06Q 50/00*  (2012.01)

(52) U.S. Cl.
USPC ............... 370/256; 370/389; 370/461; 705/2; 705/3

(58) Field of Classification Search
USPC ......................................................... 705/2, 3
See application file for complete search history.

(56) References Cited

U.S. PATENT DOCUMENTS

| | | | |
|---|---|---|---|
| 6,374,249 B1 | 4/2002 | Joslin et al. | |
| 7,974,221 B2 * | 7/2011 | Tamassia et al. | 370/256 |
| 2008/0040151 A1 * | 2/2008 | Moore | 705/2 |
| 2010/0110935 A1 * | 5/2010 | Tamassia et al. | 370/256 |

FOREIGN PATENT DOCUMENTS

| | | |
|---|---|---|
| EP | 1443445 | 8/2004 |
| WO | 02/089002 | 11/2002 |

OTHER PUBLICATIONS

Xinfa Hu, et al., "Testing Interval Trees for Real ime Scheduling Systems," 14th IEEE International Conference on Embedded and Real-Time Computing Systems and Applications, 2008. RTCSA '08., Piscataway, NJ, USA, Oct. 25, 2008, pp. 327-336.
Cormen, T.H., et al., "Introduction to Algorithms," MIT Press, London, GB, Jan. 1, 1991, pp. 290-294.
Bongki Moon, et al. "Spatiotemporal Aggregate Computation: A Survey," IEEE Transactions on Knowledge and Data Engineering, IEEE Service Center, Los Alamitos, CA, US, vol. 17, No. 2, Feb. 1, 2005, pp. 271-286.

* cited by examiner

*Primary Examiner* — Brandon Renner
(74) *Attorney, Agent, or Firm* — Baker & Hostetler, LLP

(57) ABSTRACT

The present invention includes a method for sharing a quantity of resources between several users in a telecommunication network or a computing system starting from a given date. The method includes updating a tree, each node of which represents a time period. The tree contains at least one node representing a time period including the given date. The concatenation of the time periods represented by daughter nodes of a parent node represent the time period represented by the parent node.

9 Claims, 2 Drawing Sheets

US 8,509,119 B2

METHOD OF MANAGING RESOURCES IN A TELECOMMUNICATION NETWORK OR A COMPUTING SYSTEM

CROSS-REFERENCE TO RELATED APPLICATION

This application claims priority to foreign French patent application No. FR 09 06394, filed on Dec. 30, 2009, the disclosure of which is incorporated by reference in its entirety.

FIELD OF THE INVENTION

The present invention relates to a method of managing resources in a telecommunication network or a computing system. The invention improves bandwidth over a communication link, or disk space on servers, and/or computation time on a processor.

The resources of a telecommunication network or of a computing system are often shared between several users. When the resource requirements can be planned, the administrator of the network may manage a resource reservation calendar so as to know the availability of the network. Unfortunately, when the number of reservations is high, the existing calendar management mechanisms require very long computation times.

U.S. Pat. No. 6,374,249 B1 discloses a data structure and operations for time-dependant variables in a model of an enterprise. However, the method described in that patent is not effective for managing a large number of resource reservations.

Patent application EP 1 443 445 A1 discloses an improved method and improved device for managing a resource calendar. However, on the one hand, the method and device described are not capable of efficiently managing permanent reservations, that is to say those with no end date, and, on the other hand, the calendar described is of fixed length and manages only time periods of fixed granularity. Thus, in the case of a reservation made a long time in advance, this may mean, as consequence of accepting this reservation, that the network does not have the necessary resources to support it. Finally, it periodically requires an operation expensive in $O(M \cdot \log n)$, in which n is the size of the calendar expressed as the number of smaller periods represented in the calendar and M is the number of reservations made in the calendar.

SUMMARY OF THE INVENTION

The invention optimizes the times required to execute base operations on a resource reservation calendar, e.g., the operations of adding and removing a reservation, the computation of the quantity of resources available and the shift in time of the period covered by the calendar, whatever the number, duration and granularity of the reservations. To do this, the present invention proposes to construct a dynamic reservation tree and to manage variables specific to the permanent reservations, this tree and these variables making it possible to use an algorithm efficient in $O(\log n)$ for the base operations. For this purpose, the subject of the invention is a method for sharing a quantity of resource $Q_{total}$ between several users in a telecommunication network or a computing system starting from a given date. The method includes the updating of a tree, each node of which represents a time period. The tree contains at least one node representing a time period that includes the given date. The concatenation of the time periods represented by the daughter nodes of a parent node represents the time period represented by said parent node.

Advantageously, the updating of the tree may comprise, so as to record a period of reservation P of a quantity $Q_r$ of resources by a user in the tree, a step of adding nodes to the tree in such a way that the root node of the tree includes the start date of the period P.

The step of adding nodes to the tree may furthermore include adding all the minimum nodes of the reservation period P. If the reservation P is a non-permanent period with an end date, a node is a minimum node of the reservation P if it represents a time period included within the period P and if its parent node represents a time period not entirely included within the period P. If the reservation period P is a permanent period with no end date, a node is a minimum node of the reservation period P if it represents a time period included within the period going from the start date of the period P up to the end of the time period represented by the root node of the tree.

In an embodiment, each node of the tree may contain a field $Q_n$ equal to the sum of the quantities of resources reserved for the reservations having said node from among its minimum nodes, and also a field $Q_f$ equal to zero if said node has no daughter nodes or is equal to the maximum of $Q_n+Q_f$ for all the daughter nodes of said node if said node has at least one daughter node.

In an embodiment, the method may include a step of computing the quantity $Q_d$ of resources available over the reservation period P. If the start date of the period P is after the end of the time period represented by the root node of the tree, then the quantity $Q_d$ is equal to $Q_{total}-Q_{p0}-Q_{p1}$, in which $Q_{p0}$ is a variable equal to the sum of quantities of resources reserved for the permanent reservations having the root node of the tree as minimum node and $Q_{p1}$ is a variable equal to the sum of the quantities of resources reserved for permanent reservations not having the root node of the tree as minimum node. Otherwise, the quantity $Q_d$ is equal to $$Q_{total} - \max_{i \in \{\text{minimum nodes of } P\}} \left( Q_n(i) + Q_f(i) + \sum_{j \in \{\text{parents of } i\}} Q_n(j) \right).$$

The quantity $Q_r$ being less than the quantity $Q_d$, the step of adding nodes to the tree may furthermore include, if a daughter node of an existing node is added, setting the fields $Q_n$ and $Q_f$ of said added node to the value zero. Otherwise, if a node is added and if it is the new root node, then, if the old root node is the leftmost daughter node of the new root node, then the step of adding nodes to the tree may include assigning the value of $Q_{p0}$ to the field $Q_n$ of the new root and decrementing the field $Q_n$ of the old root by $Q_{p0}$. Otherwise, the step of adding nodes to the tree may include assigning the value zero to the field $Q_n$ of the new root, incrementing the variable $Q_{p1}$ by $Q_{p0}$ and assigning the value zero to the variable $Q_{p0}$. The step of adding nodes to the tree may then include assigning the sum of the fields $Q_n$ and $Q_f$ of the old root to the field $Q_f$ of the new root, and adding the right-hand brother nodes of the old root, the value of $Q_{p1}$ being assigned to the fields $Q_n$ of said right-hand brother nodes and the value zero being assigned to the fields $Q_f$ of said right-hand brother nodes. If the period P is a permanent period with no end date, the step of adding nodes to the tree may include incrementing $Q_{p0}$ by $Q_r$ if the root of the tree is a minimum node and otherwise incrementing $Q_{p1}$ by $Q_r$. The step of adding nodes to the tree may include adding the quantity $Q_r$ to the fields $Q_n$ of all the minimum nodes of the period P and updating the fields $Q_f$ of all the parent nodes of said minimum nodes.

Advantageously, here again, the updating of the tree may include, so as to modify or remove the recording in the tree of the reservation period P of the quantity $Q_r$ of resources, a step of modifying nodes in the tree or removing nodes therefrom. This step may include decrementing the fields $Q_n$ of all the minimum nodes of the period P by $Q_r$, updating the fields $Q_f$ of all the parent nodes of said minimum nodes and removing the leaf nodes of the tree having a field $Q_n$ equal to zero. If the period P is a permanent period with no end date, this step may include decrementing $Q_{p0}$ by $Q_r$ if the root of the tree is a minimum node, and otherwise decrementing $Q_{p1}$ by $Q_r$.

Advantageously, here again, the updating of the tree may comprise, so as to purge the tree, a step of removing the nodes from the tree that represent elapsed time periods.

For example, each node may represent a time period of duration equal to a number of years or a fraction of a year, or a number of months or a fraction of a month, or a number of days or a fraction of a day, or a number of hours or a fraction of an hour, or a number of minutes or a fraction of a minute, or a number of seconds or a fraction of a second.

For example, the given date may be the current date, so as to be able to share the quantity of resources $Q_{total}$ immediately.

For example, the quantity of resources $Q_{total}$ may be a quantity of a bandwidth expressed in bits per second, or a quantity of disk space expressed in bytes, or else a quantity of computation time for a processor expressed as a percent.

Again, the invention has the main advantages that, by making it possible for constraints on the minimum granularity and the coverage of the calendar, but not on the number of reservations, to be specifically set, it enables the time to execute the operations on the calendar to be limited. Thus, by offering computation times independent to the number of reservations, the invention is particularly suitable for real-time systems.

BRIEF DESCRIPTION OF THE DRAWINGS

Other features and advantages of the invention will become more readily apparent from the following detailed description, taken in conjunction with the appended drawings, in which.

DETAILED DESCRIPTION

The term "date" is used broadly herein. For example, a date may be expressed in the form year/month/day/hour/minute/second, but additional embodiments are not limited thereto.

In an embodiment, a resource, which can be represented by an integer, must be shared between several users. To plan the use of this resource, the users must make reservation requests. Each reservation is defined by several characteristics. A reservation first of all indicates a start date, which is equal to or greater than a predefined date $D_{min}$. The value of $D_{min}$ may increase over the course of time, since $D_{min}$ may, for example, correspond to the current date. A reservation may possibly indicate an end date. If no value is provided for this end date, the reservation is said to be a permanent reservation. A reservation also indicates the quantity of resources to be reserved. For example, this may involve the bandwidth in bits per second over a communication link, or disk space in bytes on a server, or else computation time as a percent on a processor.

Figure 1:
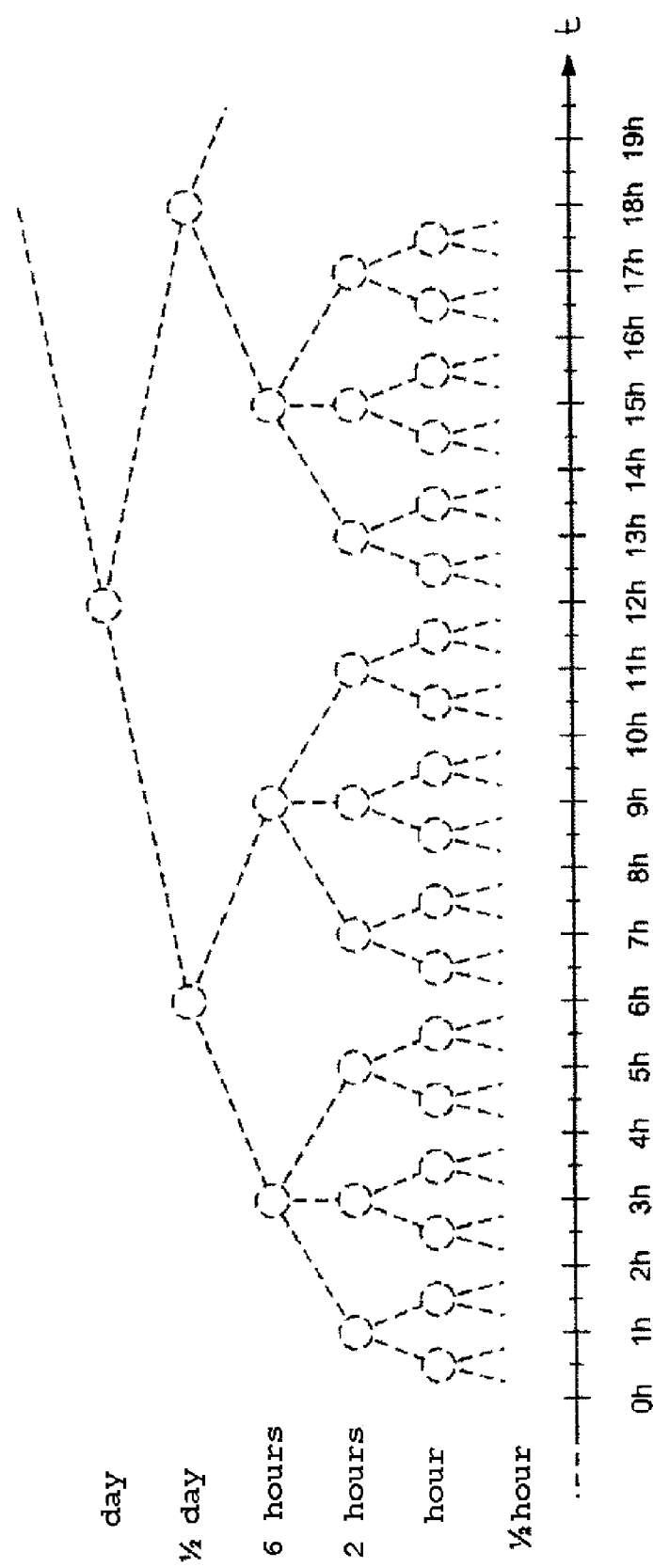
FIG. 1 is, an example of a calendar grid according to the invention.

FIG. 1 illustrates an example of a calendar grid according to the invention. A calendar according to the invention is a tree structure of reservations following the grid illustrated in FIG. 1. The grid illustrated in FIG. 1 may also be seen as an empty calendar according to the invention, in which no reservation has yet been made.

Each node of the grid is illustrated by a dotted circle and represents a period of time. Each node is the parent of a set of daughter nodes, which each represent a portion of the time period of the parent node. The concatenation of all the periods represented by the daughter nodes is equal to the period represented by the parent node. For example, each day is represented by a node, which has itself two daughter nodes each representing a half-day, which themselves each have two daughter nodes each representing a period of 6 hours, which themselves each have three daughter nodes each representing a period of 2 hours, which themselves each have two daughter nodes each representing a period of 1 hour. For the sake of clarity, the nodes representing periods of ½ hour have not been shown in FIG. 1. Thus, a day may be represented by a number of nodes varying from one to infinity.

Any calendar according to the invention is the instance of a part of the grid illustrated by FIG. 1. A calendar according to the invention is a tree, the nodes of which are instanced so that:

a node is instanced only when it is necessary to record a reservation in the calendar, as explained below. However, the tree must have a minimum of one node, which represents a period of time including the previously defined date $D_{min}$, and there is no limit in the depth of the tree if no constraint is fixed on possible reservations.

It should be noted that, to improve the efficiency of the invention, it is preferable for the grid to be divided into the times usually used for reservations. For example, it is preferable for the nodes to represent days, ½ days and periods of 6, 2 and 1 hour, rather than 1024th of a year.

A set of minimum nodes in the calendar grid corresponds to a finite reservation period P, i.e. one with an end date. A node is minimum for the finite period P if and only if this node meets the following two conditions:

the period represented by the node is included within the period P; and the period represented by the parent node is not entirely included within the period P.

A set of minimum nodes in the calendar grid also corresponds to an infinite reservation period P, i.e. one with a start date but no end date. The set of minimum nodes of the infinite period P is equal to the minimum nodes of the period going from the start of the period P up to the end of the period represented by the root of the tree. If the start date of the infinite period P is after the period represented by the root of the tree, then the tree is extended so that the new root of the tree includes the start date of the period P.

It should be noted that, as illustrated for example in FIG. 2 below, when a reservation is added to the tree, each minimum node of the reservation period is instanced in the tree.

Figure 2:
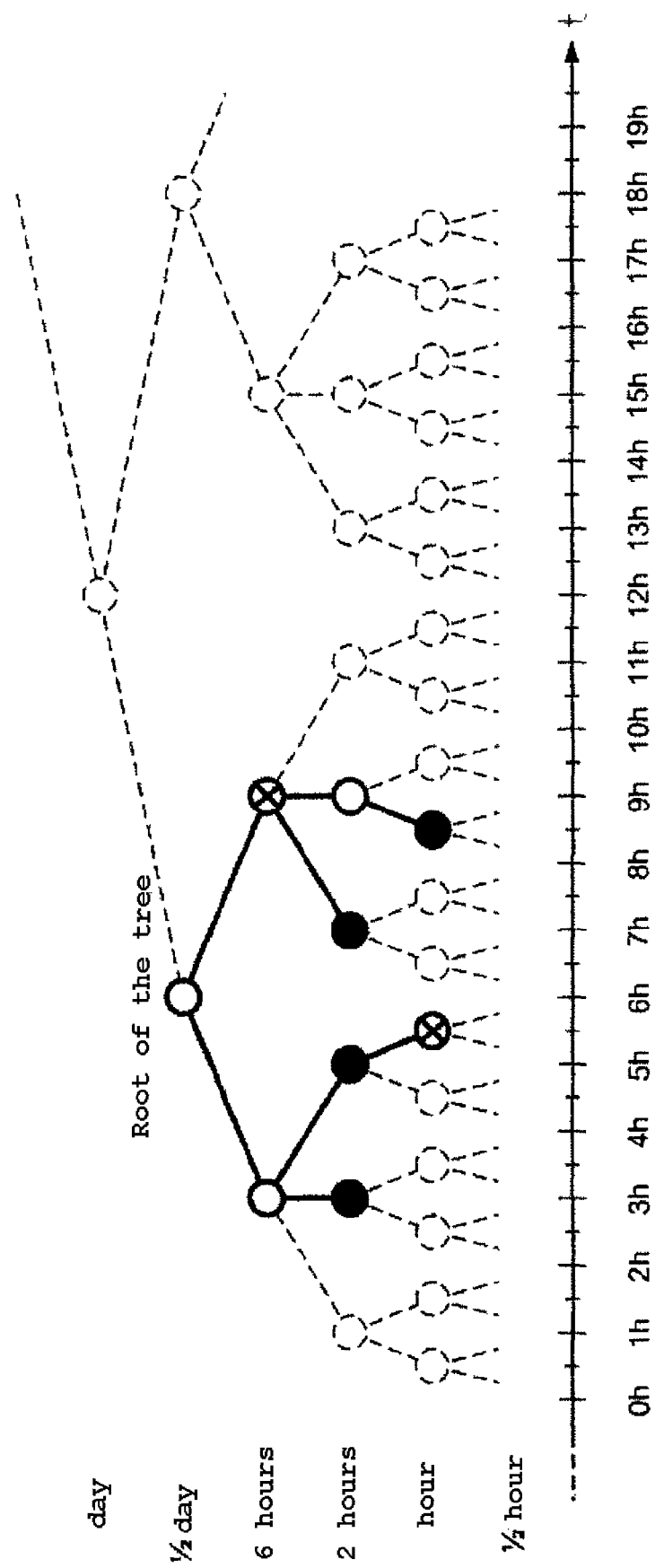
FIG. 2 is an example of a calendar according to the invention.

FIG. 2 illustrates an example of a calendar according to the invention containing a first reservation going from 2 h to 9 h and a second, permanent reservation starting at 5 h. The tree corresponding to this calendar is indicated by the bold solid lines. The root of this tree is indicated in FIG. 2. The minimum nodes of the first reservation are indicated in black. The minimum nodes of the second reservation are indicated by a cross.

The number of minimum nodes for a reservation is at most equal to $2 \log_2(n)+2(o-2)$, where n is the size of the calendar expressed as number of shortest periods represented in the tree, i.e. the period of the leaves of the tree at the lowest level, and o is the order of the tree. The path of these minimum nodes may be effected as $O(\log(n))$. Two values are stored in each node of the tree, namely:

$Q_n$: the sum of the quantities of resources reserved for the reservations having this node as minimum node; and $Q_f$: the maximum value of $(Q_n+Q_f)$ between all the daughter nodes, or zero if the node has no daughters.

In addition to the tree described above, two integer variables are defined:

$Q_{p0}$ is the sum of the quantities of resources reserved for permanent reservations having the top of the tree as minimum node; and $Q_{p1}$ is the sum of the quantities of resources reserved for permanent reservations not having the top of the tree as minimum node.

These variables are used when a new reservation requires the tree to be extended in order to cover a longer time period, as explained below.

Advantageously, the present example of a calendar according to the invention may be managed using four base operations: computation of the quantity of resources available over a given period; addition of a reservation; removal of a reservation; and purging of the past. Purging of the past is a very optional operation amounting to removing the leftmost branch of the tree, corresponding to the period that has just elapsed. As defined below, each of these operations may be carried out with a time complexity expressed as $O(\log n)$, where "n" is the size of the calendar expressed as the number of shortest periods represented in the tree, i.e. the period of the leaves of the tree at the lowest level.

Advantageously, the operation of computing the quantity of resources available over a given period P may be carried out in the following manner. First of all, the start of the period P must be greater than or equal to $D_{min}$. The total quantity of resources to be distributed is denoted by $Q_{total}$.

If the start of the period P is greater than or equal to the end of the period covered by the tree, then the quantity available over the period P is equal to $Q_{total}-Q_{p0}-Q_{p1}$. Otherwise, the quantity available over the period is equal to:

$$Q_{total} - \max_{i \in \{minimum\ nodes\ of\ P\}} \left( Q_n(i) + Q_f(i) + \sum_{j \in \{parents\ of\ i\}} Q_n(j) \right)$$

where $Q_n$ and $Q_f$ are zero for the nodes of the grid that have not been instanced in the tree. It should be noted that the path of the set of minimum nodes may be made with a time complexity expressed as $O(\log n)$. Since this path is followed from the root of the tree, the sum of the quantities $Q_n(j)$ is thus easily computed.

Advantageously, the operation of adding a reservation may be carried out by adding the quantity of resources reserved to the quantities $Q_n$ of all the minimum nodes of the reservation period and by recomputing $Q_f$ for all the parents of the minimum nodes. This operation may require adding nodes to the tree. For each node created:

if the node created is the daughter of an existing node, then the $Q_n$ and $Q_f$ values are set to zero;

otherwise, the node created is the new root of the tree and the following operations are carried out in the order below:

if the old root is the leftmost daughter of the new root, then:
$Q_n$(new root)=$Q_{p0}$;
$Q_n$(old root)=$Q_n$(old root)−$Q_{p0}$,
otherwise:
$Q_n$(new root)=0;
$Q_{p1}$=$Q_{p1}$+$Q_{p0}$;
$Q_{p0}$=0.
$Q_f$(new root)=$Q_n$(old root)+$Q_f$(old root).
The right-hand brothers of the old root are created with:
$Q_n$=$Q_{p1}$;
$Q_f$=0.
If the new reservation is permanent, then the quantity of resources reserved is added to $Q_{p0}$ if the root of the tree is a minimum node, otherwise it is added to $Q_{p1}$.

Advantageously, the operation of removing a reservation may be carried out by subtracting the quantity of resources reserved from the quantities $Q_n$ of all the minimum nodes of the reservation period with $D_{min}$ as minimum date and by recomputing the $Q_f$ for all the parents of the minimum node.

Along the path of the minimum nodes, the leaves of the tree having a zero $Q_n$ may be destroyed.

If the reservation removed was a permanent reservation, then the quantity of resources reserved is subtracted from $Q_{p0}$ if the root of the tree is a minimum node, otherwise it is subtracted from $Q_{p0}$.

Advantageously, the operation of purging the past may enable the memory to be freed up by removing the nodes that correspond to a past period. It is planned at the end date of the leftmost leaf of the tree. $D_{min}$ then takes this end date as new value. As indicated above, the new value of $D_{min}$ must be included within the period covered by the root. If necessary, a new root may be created, as during the addition of a reservation. All the nodes of the left-hand branch of the tree having an end date equal to or earlier than $D_{min}$ are then removed. It should be noted that recomputing the $Q_f$ of the parent nodes is not necessary since, owing to the new value of $D_{min}$, these nodes may no longer form part of the minimum nodes of a reservation.

The invention described above is particularly efficient when the number of reservations is large.

What is claimed is:

1. A method for sharing a quantity of resources $Q_{total}$ between several users in a telecommunication network or a computing system, starting from a given date, said method comprising an updating of a tree, wherein each node of the tree represents a time period, the tree containing at least one node representing a time period that includes the given date, each node being a parent node of a set of daughter nodes representing a portion of a time period of the parent node a concatenation of the time periods represented by a daughter node being equal to the time period represented by the parent node, the updating of the tree includes, to record a reservation period P of a quantity $Q_r$ of resources by a user in the tree, a step of adding nodes to the tree in such a way that a root node of the tree includes a start date of the reservation period P, and said method further comprises a step of adding nodes to the tree including adding all minimum nodes of the reservation period P, a node being a minimum node of the reservation period P if:

when the reservation period P is a non-permanent period with an end date, said minimum node represents a time period included within the reservation period P and the parent node of said minimum node represents a time period not entirely included within the reservation period P; and when the reservation period P is a permanent period with no end date, said minimum node represents a time period included within the reservation period P going from the start date of the reservation period P up to the end of the time period represented by the root node of the tree.

2. The method according to claim 1, wherein each node of the tree includes:
a field $Q_n$ equal to the sum of the quantities of resources reserved for the reservations having said each node from among its minimum nodes;
a field $Q_f$ equal:
to zero if said each node has no daughter node; and
to a maximum of $Q_n + Q_f$ for all daughter nodes of said each node if said each node has at least one daughter node.

3. The method according to claim 2, further comprising a step of computing a quantity $Q_d$ of resources available over the reservation period P, the quantity $Q_d$ being equal:
to $Q_{total} - Q_{p0} - Q_{p1}$ if the start date of the period P is after an end of the time period represented by the root node of the tree, in which:
$Q_{p0}$ is a variable equal to a sum of the quantities of resources reserved for permanent reservation periods having the root node of the tree as the minimum node;
$Q_{p1}$ is a variable equal to the sum of the quantities of resources reserved for permanent reservation periods not having the root node of the tree as the minimum node; and otherwise to $$Q_{total} - \underset{i \in \{minimum\ nodes\ of\ P\}}{\text{Max}} \left( Q_n(i) + Q_f(i) + \sum_{j \in \{parents\ of\ i\}} Q_n(j) \right).$$

4. The method according to claim 3, wherein, the quantity $Q_r$ being less than the quantity $Q_d$, the step of adding nodes to the tree further comprises:
if a daughter node of an existing node is added, setting the fields $Q_n$ and $Q_f$ of said added node to the value zero;
otherwise, if a node is added as a new root node, then:
if an old root node is a leftmost daughter of the new root node, then:
assigning the value of $Q_{p0}$ to the field $Q_n$ of the new root node;
decrementing the field $Q_n$ of the old root node by $Q_{p0}$; and
otherwise:
assigning a value of zero to the field $Q_n$ of the new root node;
incrementing the variable $Q_{p1}$ by $Q_{p0}$;

assigning a value of zero to the variable $Q_{p0}$;
assigning the sum of the fields $Q_n$ and $Q_f$ of the old root node to the field $Q_f$ of the new root node;
adding right-hand brother nodes of the old root, the value of $Q_{p0}$ being assigned to the fields $Q_n$ of said right-hand brother nodes and the value zero being assigned to the fields $Q_f$ of said right-hand brother nodes;
if the reservation period P is the permanent period with no end date:
if the root node of the tree is the minimum node, incrementing $Q_{p0}$ by $Q_r$; and
otherwise, incrementing $Q_{p1}$ by $Q_r$;
adding the quantity $Q_r$ to the fields $Q_n$ of all the minimum nodes of the reservation period P; and
updating the fields $Q_f$ of all the parent nodes of said minimum nodes.

5. The method according to claim 3, wherein the updating of the tree comprises, to modify or remove a recording in the tree of the reservation period P of the quantity $Q_r$ of resources, a step of modifying nodes in the tree or removing nodes therefrom, said step comprising:
decrementing the fields $Q_p$ of all the minimum nodes of the period P by $Q_r$;
updating the field $Q_f$ of all the parent nodes of said minimum nodes;
removing leaf nodes of the tree having a field $Q_n$ equal to zero;
if the reservation period P is the permanent period with no end date:
if the root node of the tree is a minimum node, decrementing $Q_{p0}$ by $Q_r$; and
otherwise, decrementing $Q_{p1}$ by $Q_r$.

6. The method according to claim 1, wherein the updating of the tree comprises, to purge the tree, a step of removing nodes from the tree, representing elapsed time periods.

7. The method according to claim 1, wherein said each node represents said time period of a duration equal to one of:
a number of years or a fraction of a year;
a number of months or a fraction of a month;
a number of days or a fraction of a day;
a number of hours or a fraction of an hour;
a number of minutes or a fraction of a minute; and
a number of seconds or a fraction of a second.

8. The method according to claim 1, wherein the given date is a current date, to share the quantity of resources $Q_{total}$ immediately.

9. The method according to claim 1, wherein the quantity of resources $Q_{total}$ is one of:
a quantity of bandwidth expressed in bits per second;
a quantity of disk space expressed in bytes; and
a quantity of computation time of a processor expressed as a percent.

* * * * *